March 15, 1960     J. G. MACDONALD     2,928,381
CIRCLE DRIVE MECHANISM

Filed May 31, 1956     5 Sheets-Sheet 1

INVENTOR
J.G. MACDONALD
BY Douglas S. Johnson
ATTY.

March 15, 1960 J. G. MACDONALD 2,928,381
CIRCLE DRIVE MECHANISM
Filed May 31, 1956 5 Sheets-Sheet 2

INVENTOR
J.G. MACDONALD
ATTY.

March 15, 1960 J. G. MACDONALD 2,928,381
CIRCLE DRIVE MECHANISM
Filed May 31, 1956 5 Sheets-Sheet 3
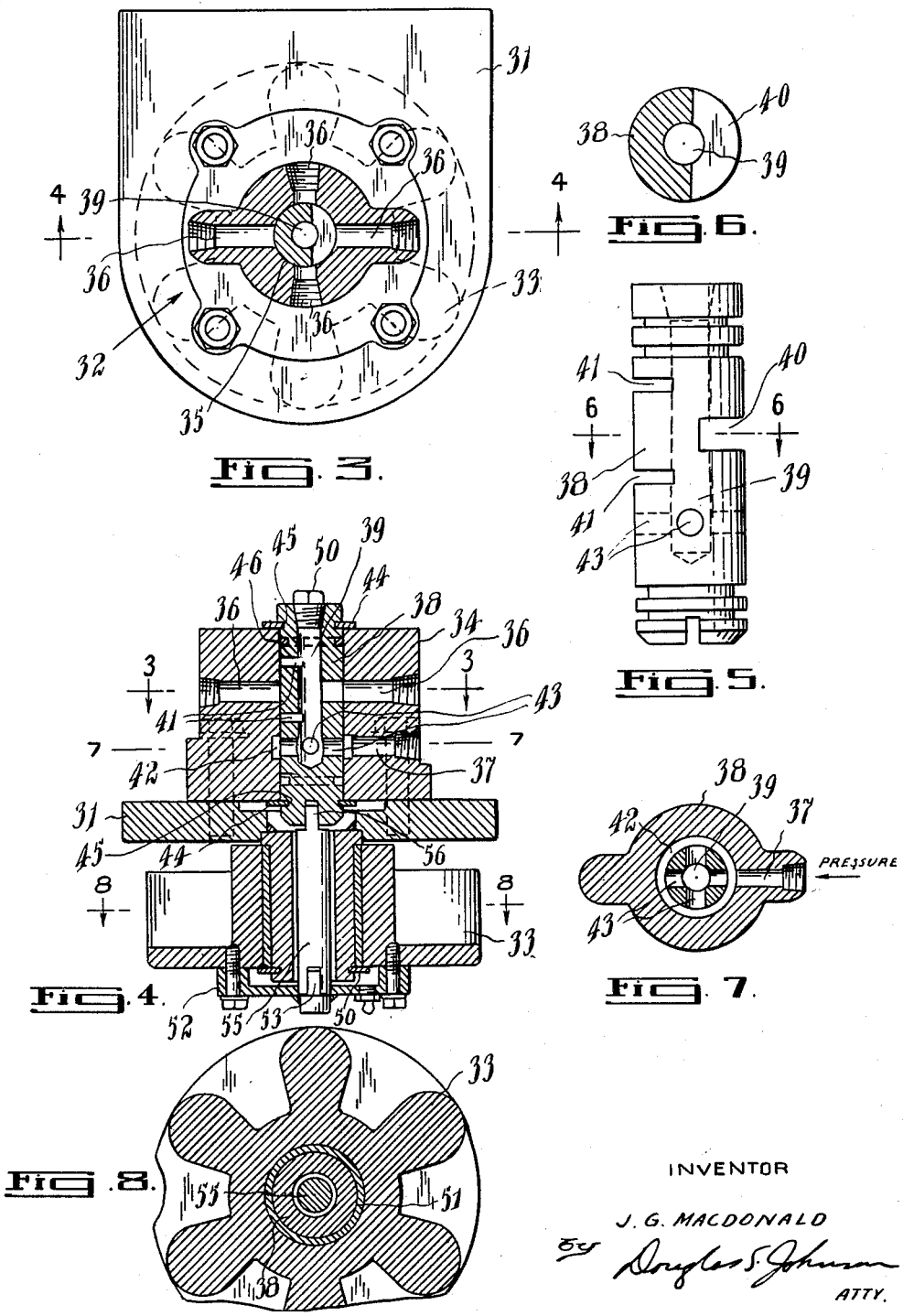
INVENTOR
J. G. MACDONALD
ATTY.

March 15, 1960   J. G. MACDONALD   2,928,381
CIRCLE DRIVE MECHANISM

Filed May 31, 1956   5 Sheets-Sheet 4

INVENTOR
J. G. MACDONALD
By Douglas S. Johnson
ATTY.

March 15, 1960    J. G. MACDONALD    2,928,381
CIRCLE DRIVE MECHANISM
Filed May 31, 1956    5 Sheets-Sheet 5

INVENTOR
J. G. MACDONALD
ATTY.

United States Patent Office

2,928,381
Patented Mar. 15, 1960

2,928,381

CIRCLE DRIVE MECHANISM

John G. Macdonald, Goderich, Ontario, Canada, assignor to The Dominion Road Machinery Co., Limited, Goderich, Ontario, Canada Application May 31, 1956, Serial No. 588,507

15 Claims. (Cl. 121—120)

This invention relates to improvements in the drives for circles or turntables of graders, shovels, back-hoes and other similar equipment.

There are many applications of turning "circles" or turntables in machines of the type aforesaid where it is desired to rotate a power-operated device such as a scraper or plough blade, a winch or hoist mechanism or shovel boom of a back hoe. The use of such a circle or ring is shown in connection with a scraper blade on a road grader in my patent, No. 2,577,340, December 4, 1951, and its other applications will be readily understood by those skilled in the art.

In its conventional form the circle or turntable comprises an internally toothed ring mounted to rotate about a central axis on a beam, support, or frame which may or may not be movable depending on the nature of the particular machine on which the circle is installed. The drive to the circle is normally through a suitable motor, the motor in turn driving through a gear reduction a suitable pinion meshing with the circle teeth.

In some cases a separate locking device is used to hold the circle in the selected position, and in other cases use is made of a non-reversible gear worm reduction to lock the circle. When no separate locking device is used only one tooth of the pinion is actually engaged with the teeth on the circle and therefore due to the limited contact area of the teeth severe wear occurs. As the circle normally, in actual operation, occupies a fairly small range of positions, the pinion thus normally only engages a small segment of the circle teeth and the wear on the circle teeth as well as the pinion is thus of substantial consequence.

Moreover, since shock loads transmitted through the circle must be sustained by the limited area of tooth contact, the pinion and circle are subject to a high incidence of damage. This source of damage is becoming more and more pronounced as the power of road graders and other machines to which this invention is applicable is continuously increased. The limited tooth contact area between the pinion and circle also limits the power which can be transferred to the circle from the drive motor without damaging the contacting teeth.

Where a separate lock for the circle is employed the inconvenience of having to first unlock the circle before turning it arises, and of course there is the additional locking mechanism and associated controls necessary to effect locking and unlocking.

It is therefore the object of the present invention to overcome the difficulties previously encountered in connection with the driving of the circle or turntable.

More specifically it is the object of the invention to provide a circle drive which will, without requiring any separate locking mechanism, provide a positive lock holding the circle in any desired position against rotation, and which will provide adequate pinion to circle teeth contact area to enable adequate torque to be transmitted to the circle and to greatly minimize wear and withstand shock loads transmitted through the circle.

In this connection it is the object to provide a balanced circle drive by means of which torque can be transmitted to the circle through the circle teeth simultaneously at spaced points, the drive thus enabling the transfer of adequate power to the circle without detriment thereto.

Again it is an object to provide a balanced drive as aforesaid which will be free from any danger of stalling throughout the complete 360° rotation of the circle.

Still a further important object is to eliminate the conventional expensive driving motor and gear reduction unit and to provide a drive as aforesaid of economical and reliable construction.

The principal feature of the invention resides in driving the circle by means of a pair of pinions engaging the circle teeth at peripherally spaced points, the pinions being driven simultaneously by a pair of cranks actuated by a pair of double acting hydraulic cylinder units, the relationship of the cylinder piston and its respective crank of one of the cylinder units being 90° out of phase with the other cylinder piston and its respective crank whereby stalling is eliminated.

In the preferred form of the invention the pinion cranks are arranged in right angular relation to obtain the 90° out-of-phase relationship in the system, this arrangement allowing convenient mounting of the hydraulic cylinders as will hereinafter appear.

Another important feature resides in the provision of a simple hydraulic system by means of which the pinion movement is precisely synchronized to apply torque simultaneously at the spaced circle drive points and to provide, without the requirement of any separate mechanism, a lock for the circle in any desired position of circle rotation.

In the preferred embodiment of the invention hereinafter illustrated and described, a pair of hydraulic valves with associated pinion drives are driven in synchronism by the circle, the one valve directing the hydraulic fluid to the double acting cylinders from the source and the other valve directing the hydraulic fluid back from the cylinders for one direction of circle rotation, the system on reversing of the function of the valves enabling reversing of the direction of circle rotation and on blocking of fluid flow to and from the valves enabling locking of the circle in any rotational position.

In this connection it is an important feature to drive the valves by means of pinions which are identical in size and pitch to the circle driving pinions so that synchronism of valve and circle positions can be maintained.

A further feature resides in mounting the valves and their pinion drives in a protected position within the circle and in providing a non-rigid drive between the valve pinions and the moving valve members which they drive so that any jamming of the pinion such as caused by a stone or other foreign body becoming caught between the pinion and circle teeth will not transmit any excessive side load to the more delicate valve parts.

These and other objects and features will become apparent from the following descriptions taken in conjunction with the accompanying drawings in which Figure 1 is a plan view partly broken away of a circle or turntable having a drive constructed in accordance with the invention.

Figure 3 is a plan section of one of the valve members of the drive taken on the line 3—3 of Figure 4.

Figure 4 is a mid-vertical sectional view of the valve of Figure 3.

Figure 5 is an elevational view of the valve spool.

Figure 6 is a horizontal section on the line 6—6 of Figure 5.

Figures 7 and 8 are horizontal sections on the lines 7—7 and 8—8 of Figure 4 respectively.

Figure 9:
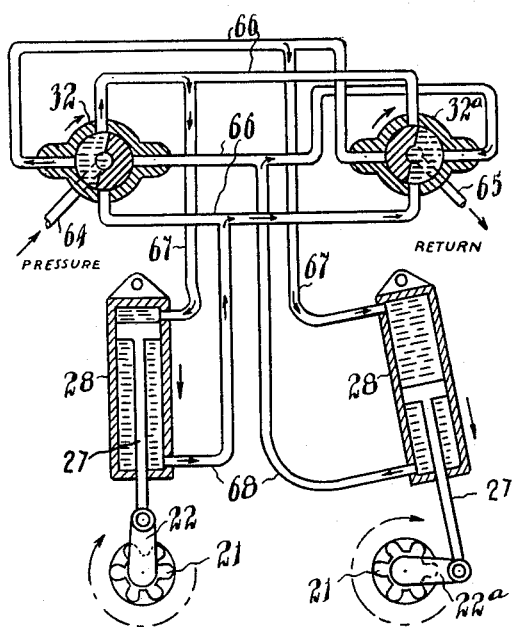

Figure 9 is a part horizontal sectional-part diagrammatic view illustrating the relationship of the circle drive pinion cranks and hydraulic cylinders and the control valves for one circle position.

Figure 10:
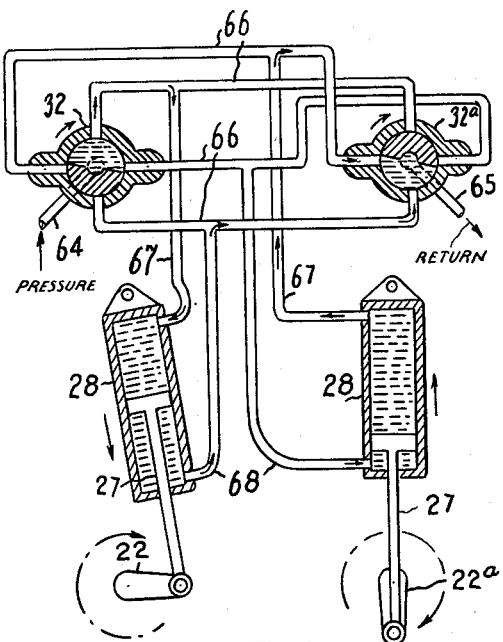
Figure 11:
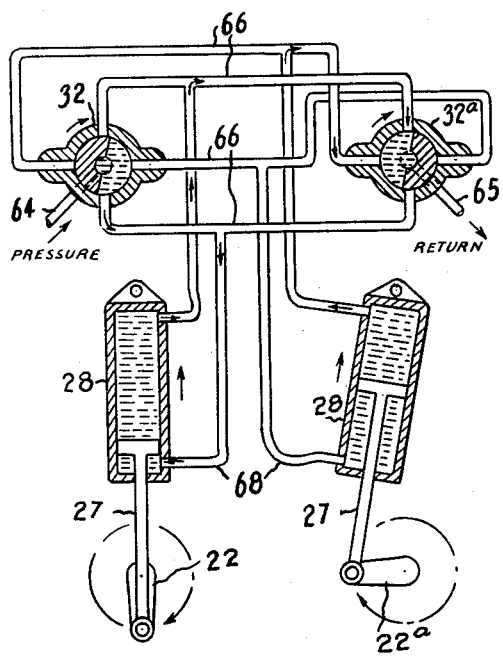
Figure 12:
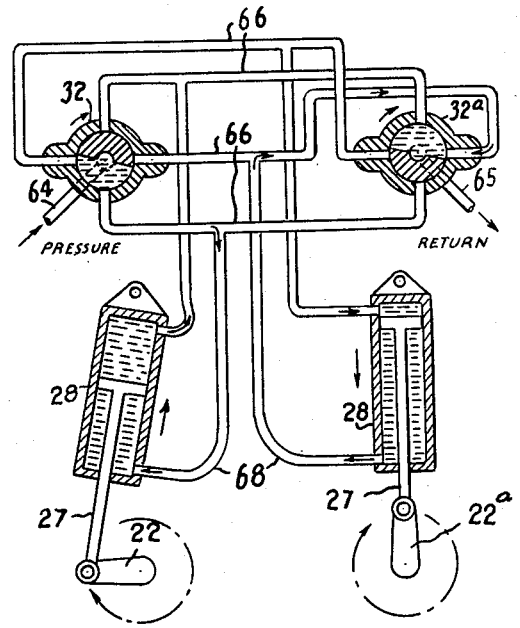

Figures 10, 11 and 12 are views similar to Figure 9 but showing progressive movement of the cranks, cylinders and control valves in 90° steps.

Figures 13, 14:
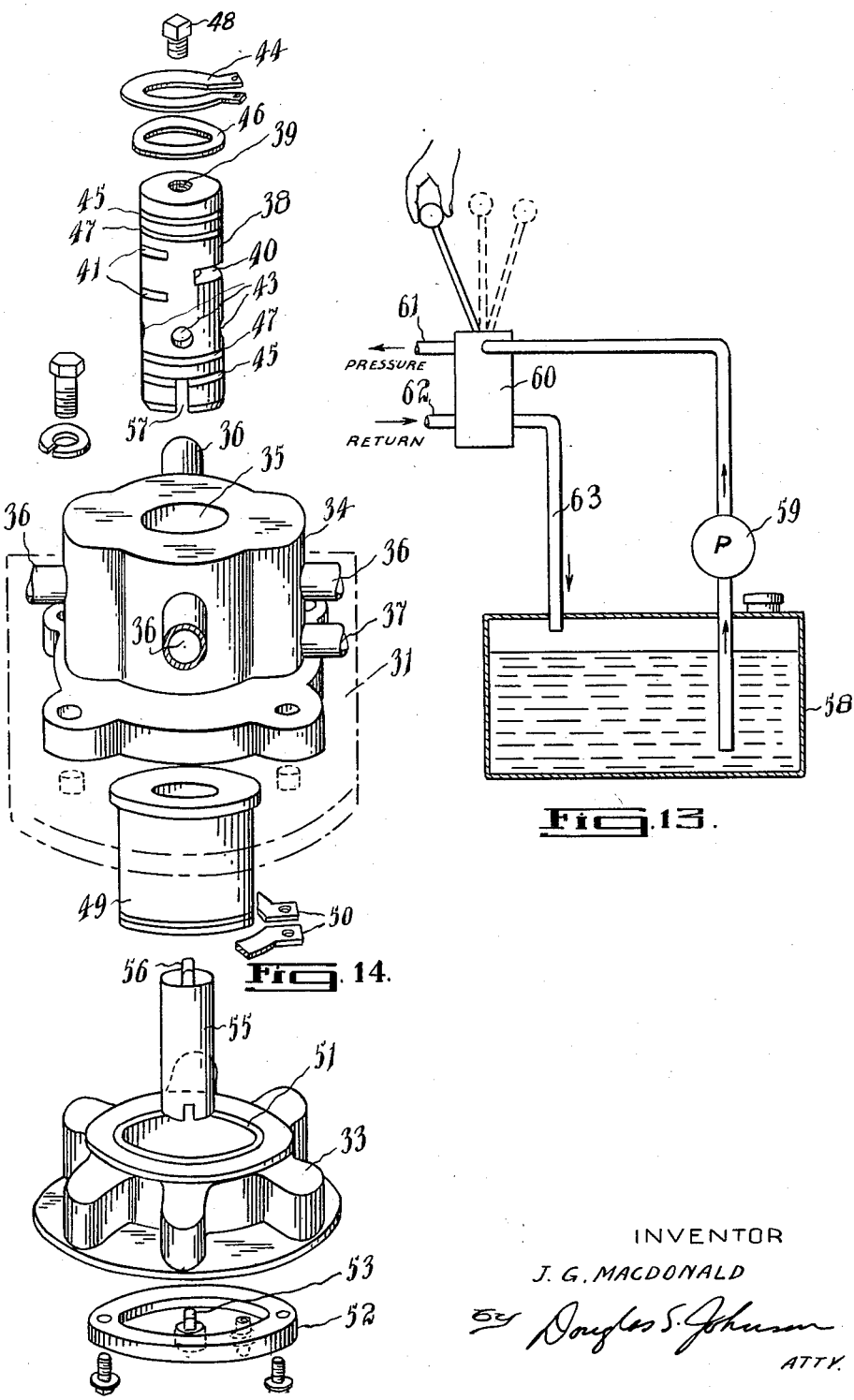

Figure 13 is a diagrammatic view partly in section of the reservoir, pump, and control valve of the hydraulic system and Figure 14 is an exploded perspective view of one of the circle control valves shown in Figures 3 to 8.

Figure 1:
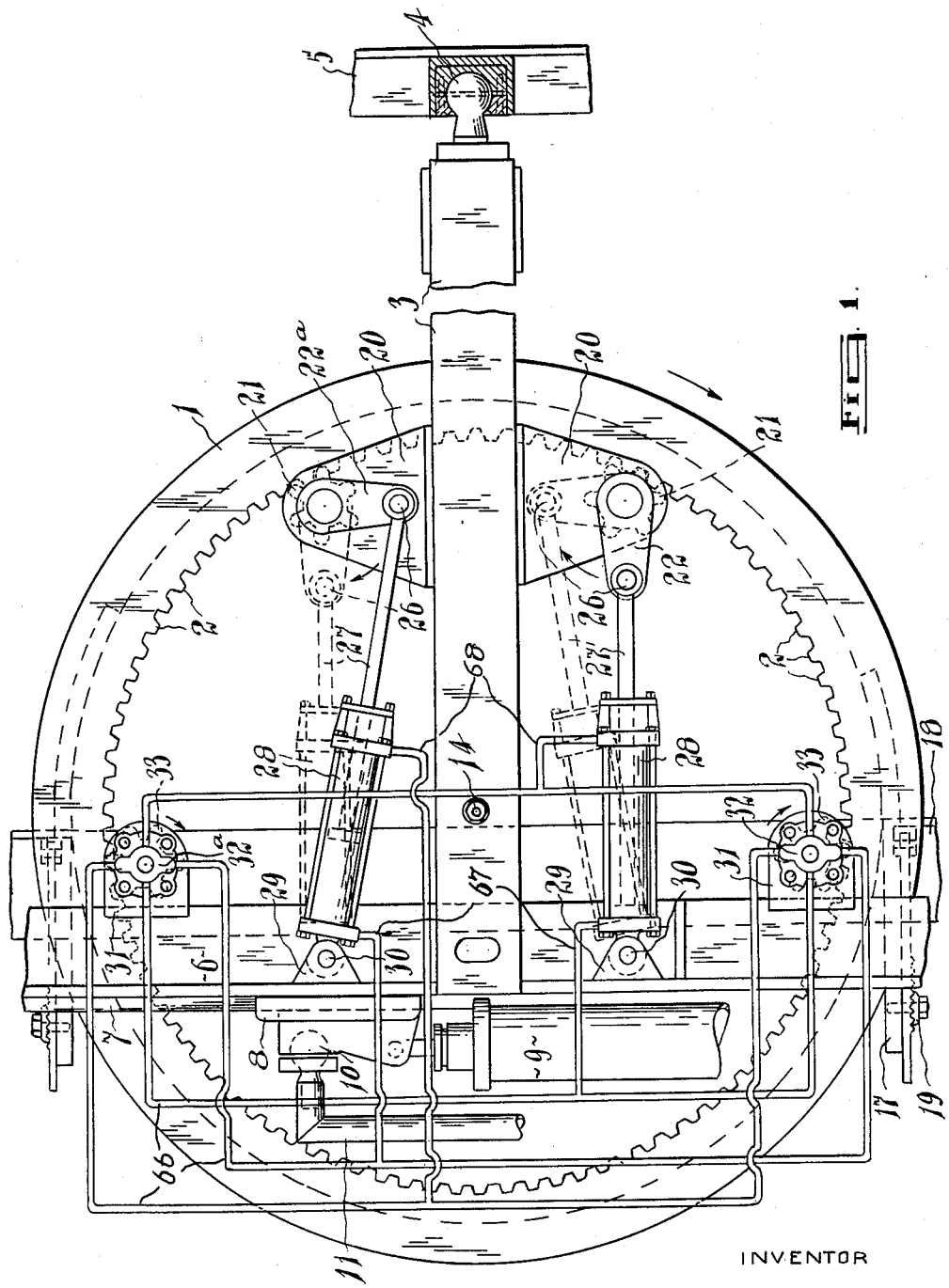

Referring to Figure 1, the circle or turntable generally designated at 1 and which comprises an internally toothed ring having internal teeth 2 is shown mounted on a draw bar 3 swivelled at 4 from a support 5. The mounting of a circle in such a manner is found, for instance, in road graders such as disclosed in my Patent No. 2,577,340 dated December 4, 1951, but it will be appreciated that the actual support on which the circle or turntable is mounted will vary according to the type of machine with which it is used. For instance, if the circle or turntable is employed on a shovel or back hoe, the support, instead of being swivelled, may be stationary.

Figure 2:
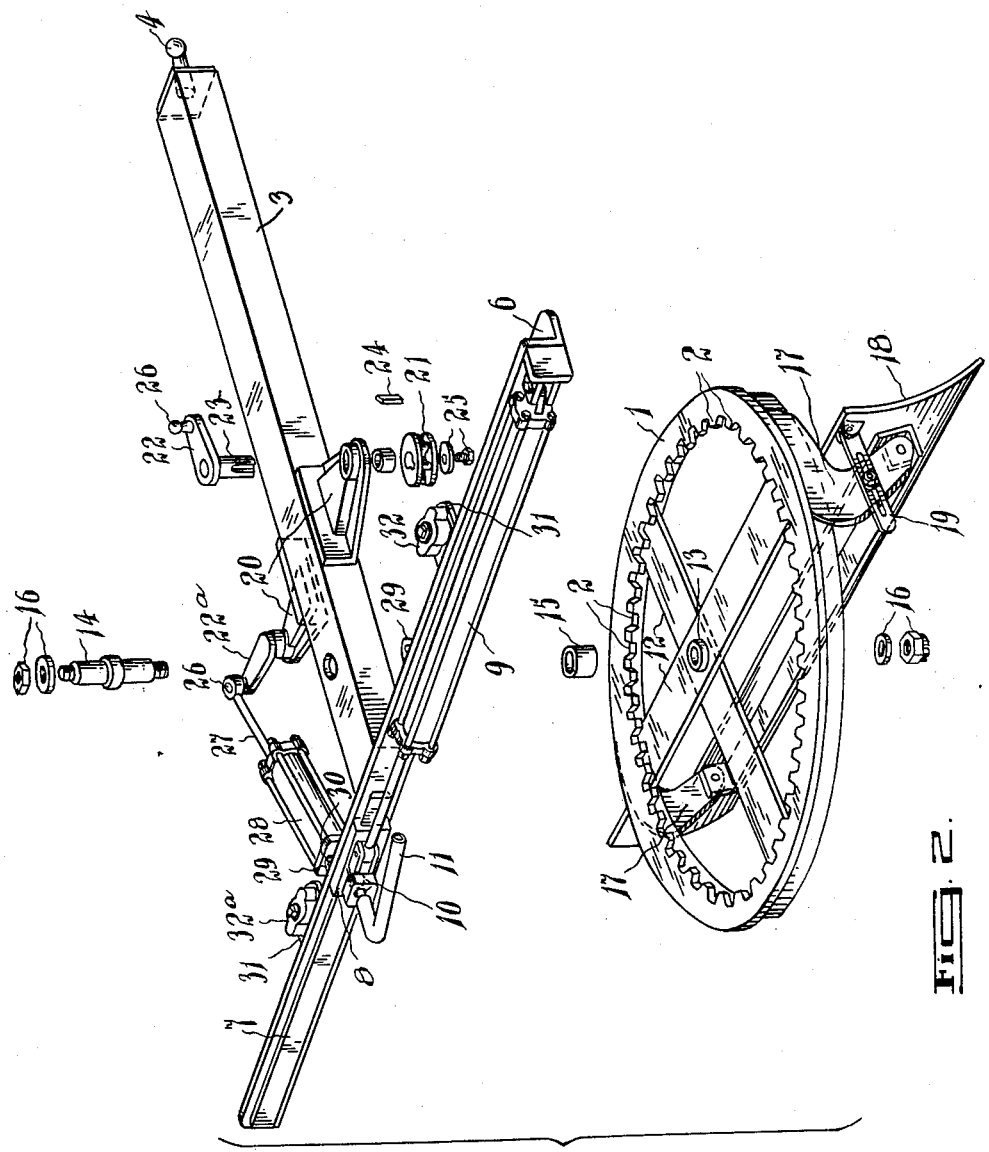
Figure 2 is a perspective partly exploded view of the circle of Figure 1 with some of the parts being omitted for the sake of clarity.

As seen in Figure 1 and more particularly, in Figure 2 the draw bar 3 has at the rearward end a transverse angle 6 secured thereto carrying on its rear face at one end a guide 7 along which operates a slide 8 actuated by a hydraulic cylinder unit 9. Swivelled at 10 to the slide 8 by means of a suitable ball and socket joint is a hanger 11 which is carried from the main frame of the machine not shown.

It will be understood that such details of the drawbar support merely illustrate the manner of the drawbar suspension in a particular application of the circle mechanism 1 in a road grader of the type referred to and again the particular circle support is not an essential of the invention but serves as merely an illustration of an application of the invention.

As seen in Figure 2, the circle 1 is provided with cross braces 12 which carry at the centre of the circle a suitable bushing 13 by means of which the circle is supported from the draw bar 3 for rotation about its axis by a king pin 14 supported in a suitable bushing 15 carried by the draw bar, the king pin and circle being assembled by means of the usual nut and washer components 16. In the particular illustration, the circle 1 is shown as provided with depending arms 17 which carry a mould board or scraper blade 18 provided with a suitable tilt adjuster 19.

Secured to each side of the draw bar 3 forwardly of the axis 14 of the circle is a bracket 20 on which is journalled a drive pinion 21 meshing with the teeth 2 of the circle 1. The two pinions 21 are of identical pitch and size so that each pinion has a tooth in contact with a circle tooth during circle drive.

Secured to each of the pinions 21 is a crank, one of which is indicated at 22 and the other at 22a, the cranks being disposed as shown in Figure 1 in right angular relation, that is a relation 90° out of phase as hereinafter more fully explained.

To effect the drive or connection between the cranks 22 and 22a and the pinions 21, each of the cranks is provided with a depending pin 23 as shown in Figure 2, the pin being keyed to the pinion by a suitable key 24. Conventional assembly components 25 are provided for assembling each crank and its pinion to the respective brackets 20.

Each of the cranks 22 and 22a is pivoted at 26 by means of a suitable ball joint to the piston 27 of a hydraulic cylinder unit 28 having the cylinder thereof pivoted to the circle draw bar or support assembly 3. To effect the pivoting of the cylinders, the transverse draw bar angle 6 is provided with suitable pivot lugs or brackets 29 on each side of the draw bar, the relationship being such that the pivot axes 30 of the cylinders are spaced at the same spacing as the pinion axes 23. Thus a line drawn between the hydraulic cylinder pivot 30 and the pinion or crank axis 23 on one side of the draw bar will be parallel to a corresponding line drawn through the corresponding pivot or axis points on the opposite side of the draw bar.

Mounted on suitable brackets on each side of the draw bar are valves 32 and 32a which are of identical construction and which are each actuated as will hereinafter more fully appear by a pinion 33 meshing with the teeth 2 of the circle, the pinions 33 being of identical size and pitch and, in turn, having the same size and pitch as the pinions 21.

As shown in Figures 3, 4 and particularly Figure 14, each of the valves 32 and 32a comprises a casing 34 having an arcuate, central, vertical bore 35 having leading thereto, in the plane of the section line 3—3 in Figure 4, four lateral passages 36 symmetrically spaced around the valve. An additional passage 37 leads to the bore 35 below the passages 36.

Operating in the bore 35 is a valve spool 38 provided with a central bore 39. At one side, the spool is provided with an enlarged slot 40 adapted to selectively register with the passages 36, the slot intersecting with the bore 39 as shown particularly in Figure 4. Smaller slots 41 which also intersect with the bore 39 are disposed above and below and on the side of the spool opposite to the slot 40, the slots 41 forming a means of equalizing the hydraulic pressure on the spindle or spool 38 so that it can rotate freely in its valving action.

Adjacent the lower end of the spool bore 39, the casing 34 is formed to have an annular groove 42 communicating with the passage 37 and the spool 38 is provided with a plurality of cross bores 43 which intersect the central bore 39 to provide a continuous flow passage between the passage 37 and the spool bore 39.

As shown in Figure 4, the spool 38 is secured in the casing 34 in proper registration by spring rings 44 received in suitable grooves 45 in the spool and sealing O-rings 46 located in suitable grooves 47 in the spool are provided to seal hydraulic flow therebetween. The central bore 39 of the spool is closed by a threaded plug 48.

The pinion 33 which drives the rotary valve spool 38 as shown in Figures 4 and 14 is secured to a depending bushing 49 carried by the bracket 31 by means of a split or spring ring 50 which also serves to retain a suitable bronze bushing 51 surrounding the journal or bushing 49. Secured to the bottom of the pinion 33 is a spindle plate 52 carrying a central key 53 which engages in a slot 54 in the lower end of a quill shaft 55, the upper end of which is provided with a projecting tongue 56 which engages in a slot 57 in the lower end of the valve spool 58.

The shaft 55 is a loose fit within the bushing 49 and forms a "floating" drive between the pinion 33 and the valve spool 38 whereby any lateral thrust on the pinion 33 such as caused by the catching of a stone between the pinion and circle teeth will not be transferred through to the delicate and close tolerance valve parts and effect damage thereof.

In road graders, shovels and other such power equipment, there is conventionally provided for the hydraulically operated equipment of the machine, a suitable hydraulic reservoir 58 indicated in diagrammatic form in Figure 13, the hydraulic liquid, usually oil, from which is directed to the equipment by means of a pump 59 through a suitable control valve. This control valve is illustrated at 60 in Figure 13 in block form and comprises a conventional four-way valve by means of which pressure oil can be directed selectively along the hydraulic lines 61 and 62, as desired, the valve also having a neutral position to block oil flow from either travelling out along or returning from the lines 61 and 62. There is, of course, provided the usual return line 63.

The operation of the drive will be more fully understood with reference to Figures 9 to 12. For one sitting of the main control valve 60, pressure oil from the pump 59 is directed into valve 32 through pipe 64 connected with the valve casing passage 37 while the pressure oil is returned from the system through pipe 65 leading from the passage 37 of the casing of valve 32a. The corresponding passages 36 of the valves 32 and 32a are interconnected by suitable hydraulic lines 66 from which lead to the cylinders 28 hydraulic lines 67 and 68.

The system is synchronized with the valve spools 38 so adjusted as illustrated in Figure 9 that with the cranks 22 and 22a in the position illustrated, the pressure oil is directed from valve 32 to the upper end of both cylinders as indicated by the flow arrows 69. Thus the pistons 27 of both of the cylinders move downwardly in the direction of the arrows 70 to drive the pinions 21 in a clockwise direction, the pinions, in turn, driving the circle 1 likewise in a clockwise direction, and the circle, in turn, driving the pinions 33 of the valves in the same direction.

It will be appreciated that while the crank 22 and the cylinder piston 27 connected thereto are in alignment in the position shown in Figure 9, the piston being at the top of its stroke, the crank 22a is mid-way between its aligned positions with respect to its piston 27 and this latter piston has completed half of its downward stroke. Thus maximum torque is being transferred through crank 22a to ensure the circle movement to swing crank 22 clockwise out of its dead-centre position of Figure 9. It will be noted that the pivot of the crank 22 formed by the pin 23, the pivotal connection between the crank and the piston and the cylinder pivot axis 30 are all in alignment in Figure 9.

The hydraulic flow in the system as illustrated in Figure 9 is maintained in the same direction for a quarter turn of the pinions 21 and 33. When the pinions reach the next quarter, as illustrated in Figure 10, the pressure oil is directed still into the upper end of the left-hand cylinder driving crank 22 but into the lower end of the right-hand cylinder driving crank 22a. The piston of the left-hand cylinder in this position has reached the half-way mark in its downward stroke while the piston in the right-hand cylinder has completed its downward stroke and is about to move upwardly as indicated by the arrows. Thus the left-hand crank 22 and its piston 27 are in a position mid-way between their aligned positions while the right-hand crank 22a and its piston are in the lower aligned position. The resultant turning of the circle and valve pinions 33 effected by the driving of the cranks 22 and 22a actuates the valve spools to the positions shown in Figure 11 for the third quarter and finally, to the position shown in Figure 12 for the fourth quarter. In Figures 11 and 12 as well as Figures 9 and 10, the direction of the hydraulic flow is indicated by the arrows 69 and the direction of piston movement is indicated by the arrows 70.

Because the pinions 21 and 33 are of identical size and pitch, the synchronism of the system is constantly maintained to provide a simultaneous drive at two different points on the circle teeth through two separate pinion teeth faces simultaneously in contact with the circle teeth. Thus with the use of the two drive pinions 21, greater power can be transferred to the circle than where the drive is transferred to the circle through a single pinion tooth. Additionally, there will be double the contact area between the pinion and circle teeth to resist wear and withstand shock, and what wear that may occur, will be distributed over a greater number of teeth than in the present single pinion drives.

Since the main control valve 60 can be locked in position to block hydraulic flow to and from the valves, 32 and 32a, each of the cylinder pistons 27 can be locked in position and the circle thus locked in a given position without requiring any additional locking mechanism. Moreover, it is important to note that one cylinder and pinion alone will lock the circle so that in the event of failure of one of the cylinders and pinions, the circle may still be maintained locked in a fixed position enabling the work to be completed before repairs are made.

Since the locking effect is obtained through the main control valve 60, the movement of this valve to direct hydraulic flow to and from the valves 32 and 32a automatically effects an unlocking of the cylinder at the same time so that the danger of applying power to the circle while it is still locked is precluded.

It will be appreciated that by operating the control valve 60 to reverse the direction of hydraulic flow illustrated in Figures 9 to 12, the drive pinions 21 can be driven in an anti-clockwise direction to thus reverse the direction of rotation of the circle. The reversing of the direction of the circle will, of course, reverse the direction of rotation of the valve spools 38 to maintain the synchronism of the system. It will be appreciated that the system enables full 360° rotation of the circle in either direction to be obtained.

While in the illustration of the invention, shown particularly in Figures 9 to 12, the cranks 22 and 22a are always maintained in right-angular or 90° out-of-phase relation, it will be understood that other arrangements may be resorted to to maintain this 90° out-of-phase relation. That is, as long as one crank and its operating piston are mid-way between the aligned or dead-centre positions while the other crank and its piston are in the aligned or dead-centre positions, a constant transfer of power to the circle can be effected throughout its entire 360° rotation to prevent stalling.

It will be understood that various modifications in detail and alterations in the valving arrangement and other components may be made without departing from the spirit of the invention and scope of the appended claims.

What I claim as my invention is:

1. A circle drive mechanism comprising in combination with a support structure and a toothed circle pivotally supported from said support structure for axial rotation, a pair of pinions engaging the teeth of said circle at peripherally spaced points, a crank in driving connection with each of said pinions, a double acting hydraulic cylinder device connected to each of said cranks, the relationship of one crank and its respective hydraulic cylinder device being 90° out of phase with the relation of the other crank and its respective hydraulic cylinder device, and valve means responsive to circle position for controlling hydraulic flow to and from said hydraulic cylinder devices.

2. A circle drive mechanism comprising in combination with a circle support and an internally toothed circle ring supported therefrom to rotate about the ring axis, a pair of pinions of identical pitch mounted in driving engagement with the teeth of said circle at peripherally spaced points, a crank in driving connection with each of said pinions, a double acting hydraulic cylinder unit having its piston pivotally connected to each of said cranks to rotate same, the relationship of one piston and crank being 90° out of phase with the relation of the other piston and crank, valve means for controlling hydraulic flow to and from said hydraulic cylinder units, and means synchronized with circle movement for controlling said valves to maintain said pistons and cranks in said 90° out-of-phase relation.

3. A circle drive mechanism comprising in combination with a circle support and an internally toothed circle ring supported therefrom to rotate about the ring axis, a pair of pinions of identical pitch mounted in driving engagement with the teeth of said circle at peripherally spaced points, a crank in driving connection with each of said pinions, a double acting hydraulic cylinder unit having its piston pivotally connected to each of said cranks to rotate same, the relationship of one piston and crank being 90° out of phase with the relation of the other piston and crank, valve means for controlling hydraulic flow to and from said hydraulic cylinder units, and means synchronized with circle movement for controlling said valves to maintain said pistons and cranks in said 90° out-of-phase relation, said valve means comprising a pair of valves each including a rotatable valve spool for controlling hydraulic flow to and from said hydraulic cylinder units, and said means synchronized with circle movement comprising a pair of pinions having a pitch identical to the pitch of said first-mentioned pinions and meshing with said circle teeth, and means coupling said second-mentioned pair of pinions to said valve spools.

4. A device as claimed in claim 3 in which the means coupling said second-mentioned pinions to said valve spools comprises a loose connection.

5. A device as claimed in claim 2 in which means are provided to block hydraulic flow to and from said cylinder units to lock said circle.

6. A circle drive mechanism comprising in combination with a circle support and an internally toothed circle pivotally supported therefrom to rotate about its axis, a pair of pinions of identical pitch mounted in driving engagement with the teeth of said circle at peripherally spaced points, a crank in driving connection with each of said pinions, said cranks being disposed the one at right angles to the other, a double acting hydraulic cylinder device connected to each of said cranks, valve means for controlling hydraulic flow to and from said hydraulic cylinder devices, and means for synchronizing said valve means with circle movement.

7. A circle drive mechanism comprising in combination with a circle support and an internally toothed circle pivotally supported therefrom to rotate about its axis, a pair of pinions of identical pitch mounted in driving engagement with the teeth of said circle at peripherally spaced points, a crank in driving connection with each of said pinions, said cranks being disposed the one at right angles to the other, a pair of double acting hydraulic cylinder devices each being pivotally supported from said circle support and having a reciprocating piston operatively connected to one of said cranks, said cylinder pistons being out of phase an amount corresponding to the right angular relation of said cranks, valve means for controlling hydraulic flow to and from said cylinder devices and means synchronizing said valve means to circle movement to maintain the phase relation of said cylinder pistons and the right angular relation of said cranks constant throughout circle movement.

8. A drive mechanism for the circle or turntable of a power-operated machine in which said circle comprises an internally toothed ring pivotally supported for rotation about its axis, said drive mechanism comprising a pair of drive pinions of identical pitch meshing with the circle teeth at peripherally spaced points, a pair of cranks in driving connection with said pinions, said cranks being disposed in 90° out-of-phase relation, a pair of hydraulic double acting cylinder devices, each of said devices having a reciprocating piston operatively connected with one of said cranks, said pistons being out of phase corresponding to the out-of-phase relation of said cranks, valve means for controlling hydraulic flow to and from said hydraulic cylinder devices, and means synchronized with circle movement for operating said valve means to provide hydraulic flow to and from said hydraulic cylinder devices to rotate said cranks in the same direction in unison while maintaining their 90° out-of-phase relation.

9. A drive as claimed in claim 8 in which further means are provided to control hydraulic flow to and from said valve means to control direction of crank rotation.

10. A hydraulic circle drive for a road grader or the like comprising in combination with an internally toothed circle pivotally supported to rotate about its axis, a pair of pinions in driving engagement with the teeth of said circle at peripherally spaced points, a pair of cranks disposed in 90° out-of-phase relation in driving connection with said cranks, a pair of double acting hydraulic cylinder devices having their pistons connected to said cranks, valve means for controlling hydraulic flow to and from said hydraulic cylinder devices, and means for controlling said valve means to maintain said cranks in said 90° out-of-phase relation.

11. A drive mechanism for the circle or turntable of a power-operated machine comprising in combination with a circle support carried by the machine and a circle in the form of an internally toothed ring pivotally mounted for rotation about its center from said support, four pinions of identical pitch disposed within said circle and in meshing engagement with the teeth thereof, a crank connected to each of one pair of said pinions, a pair of double-acting hydraulic cylinder units for driving said cranks, each of said cylinder units having its cylinder pivoted to said circle support and its piston pivotally connected to one of said cranks, said cylinder units and cranks being so disposed that the relation of the piston of one unit and its crank is 90° out of phase with the relation of the piston of the other unit and its crank, and a pair of valve members in hydraulic connection with said cylinder units, said valve members each comprising a ported valve casing and a valving spool, said other pair of pinions being connected to drive said valve spools to control fluid flow through said valve members to and from said cylinder units in accordance with circle movement to maintain said pistons and their respective cranks in said 90° out-of-phase relation.

12. A drive mechanism for the circle or turntable of a power-operated machine comprising in combination with a circle support carried by the machine and a circle in the form of an internally toothed ring pivotally mounted for rotation about its center from said support, four pinions of identical pitch disposed within said circle and in meshing engagement with the teeth thereof, a crank connected to each of one pair of said pinions, a pair of double-acting hydraulic cylinder units for driving said cranks, each of said cylinder units being pivoted to said circle support and having its piston pivotally connected to one of said cranks, said cranks being disposed in right angular relation and a line joining the crank axis and cylinder pivot of one cylinder unit and its respective crank being parallel to a corresponding line joining the other cylinder unit and its respective crank, and a pair of valve members in hydraulic connection with said cylinder units, said valve members each comprising a ported valve casing and a valving spool, said other pair of pinions being connected to drive said valve spools to control fluid flow through said valve members to and from said cylinder units in accordance with circle movement to maintain said cranks in their right angular relation.

13. A drive mechanism for the circle or turntable of a power-operated machine comprising in combination with a circle support carried by the machine and a circle in the form of an internally toothed ring pivotally mounted for rotation about its center from said support, four pinions of identical pitch disposed within said circle and in meshing engagement with the teeth thereof, a crank connected to each of one pair of said pinions, a pair of double-acting hydraulic cylinder units for driving said cranks, each of said cylinder units being pivoted to said circle support and having its piston pivotally connected to one of said cranks, said cranks being disposed in right-angular relation and a line joining the crank axis and cylinder pivot of one cylinder unit and its respective crank being parallel to a corresponding line joining the other cylinder unit and its respective crank, and a pair of valve members in hydraulic connection with said cylinder units, said valve members each comprising a ported valve casing and a valving spool, said other pair of pinions being connected to said valve spools through a floating drive to control fluid flow through said valve members to and from said cylinder units in accordance with circle movement to maintain said cranks in their right-angular relation.

14. A device as claimed in claim 13 in which said floating drive comprises a quill shaft loosely fitting within and keyed to each of the pinions of said other pair of pinions and keyed in turn to one of said valve spools.

15. A device as claimed in claim 13 in which valve means are provided to block hydraulic flow to and from said cylinder units to lock said circle in a selected position of rotation.

References Cited in the file of this patent

UNITED STATES PATENTS

| | | |
|---|---|---|
| 42,272 | Carter | Apr. 12, 1864 |
| 92,052 | Howland | June 29, 1869 |
| 422,621 | Pennock | Mar. 4, 1890 |
| 1,221,085 | O'Gara | Apr. 3, 1917 |
| 2,811,139 | Lado | Oct. 29, 1957 |

FOREIGN PATENTS

| | | |
|---|---|---|
| 1,048,700 | France | Dec. 23, 1953 |